United States Patent Office 3,544,659
Patented Dec. 1, 1970

3,544,659
PREPARATION OF CYCLIC ETHER GRAFT COPOLYMERS
Peter A. Schwab, 1601 Trio Lane, and Wayne R. Sorenson, 720 E. Liberty, both of Ponca City, Okla. 74601
No Drawing. Filed Mar. 16, 1967, Ser. No. 623,543
Int. Cl. C08f 29/30
U.S. Cl. 260—874
8 Claims

ABSTRACT OF THE DISCLOSURE

A process wherein polyethers are grafted onto a backbone of vinyl polymer containing pendant protonic groups along the backbone. Said process comprises terminating the cationic polymerization of cyclic ethers with the protonic groups of the vinyl polymer.

---

This invention relates to novel graft copolymers and to a method of preparing them. More particularly, the invention is concerned with grafting a polytetrahydrofuran onto a backbone of a vinyl polymer containing pendant hydroxyl groups positioned along the backbone.

A graft copolymer is comprised of a high molecular weight backbone to which a second polymer is attached at intervals along the chain. A useful route to graft copolymers begins with a polymer containing chemically reactive or functional groups along the chain. These are then sites for the subsequent reactions with monomers or polymers which lead to graft formation. Grafts to copolymeric backbone containing reactive functional groups, such as: hydroxyl, amide, or epoxy groups, along the chain have been reported.

The polymerization of tetrahydrofuran when carried out with many combinations of Lewis acids and strained cyclic ethers (so called "promotors"), including the boron trifluoride etherateepichlorohydrin system, produces low molecular weight polymer. High molecular weight polymer can be obtained by polymerizing in the presence of catalysts without cocatalysts or promotors. These include antimony pentachloride, phosphorous pentafluoride, boron trifluoride, triphenylmethyl- and tropylium salts, and benzenediazonium hexafluorophosphate.

Although there are tetrahydrofuran polymers with a variety of end groups, most frequently polytetramethylene ether glycols are obtained; because protonic solvents, such as: methanol or water, are usually employed in terminating the polymerization.

It was unexpectedly discovered that the cationic polymerization of tetrahydrofuran can be terminated with a pendant protonic group of a vinyl polymer backbone with the resulting product being a poly(tetramethylene ether)-vinyl polymer. In this way, the poly(tetrahydrofuran) becomes chemically bonded onto the vinyl polymer. In general, this invention includes tetrahydrofuran and mixtures of tetrahydrofuran with substituted tetrahydrofurans as the substituting grafting monomers. The vinyl polymers included in this invention are those which lend themselves to cationic grafting, that is: any vinyl polymer containing a pendant group which has an active hydrogen. Included among the examples of such vinyl polymers is poly(vinyl chloride-co-vinyl alcohol-co-vinyl acetate), poly(vinyl chloride-co-vinyl alcohol-co-vinyl neodecanate), poly(styrene-co-hydroxyl-ethyl methacrylate), poly(methyl methacrylate - co - hydroxylethyl methacrylate, poly(styrene-co-acrylic acid), and poly(vinyl alcohol).

The polymerization of tetrahydrofuran using boron trifluoride etherate and epichlorohydrin as cocatalysts, in the presence of poly(vinyl chloride-co-vinyl alcohol-co-vinyl acetate) with the percentages of vinyl chloride, vinyl alcohol, vinyl acetate being 91/6/3, respectively, leads to the formation of poly(tetra-hydrofuran) grafted onto the vinyl polymer backbone.

The vinyl polymer backbone should contain a minimum of about 0.1 percent by weight of hydroxyl containing constituents in order to provide a sufficient number of active sites along the backbone to give a graft copolymer with the desired properties.

The temperature at which the grafting reaction takes place can vary over fairly wide ranges. A suitable range is 0° C. to 60° C., with the preferred temperature being about 25° C.

The catalysts useful in this invention are Lewis acids. In addition to the boron trifluoride etherate-epichlorohydrin catalyst system, other catalyst systems well known in the art can be used. Any compound containing an epoxide group may be used in place of epichlorohydrin. In place of both cocatalysts, antimony pentachloride can be used.

EXAMPLE

Polymerization of tetrahydrofuran in the presence of hydroxyl containing poly(vinyl chloride)

In a one pint screw cap resin jar, 25 grams of poly(vinyl chloride-co-vinyl alcohol-co-vinyl acetate) (91/6/3) is dissolved in 85 milliliters (75 grams) of dry tetrahydrofuran under a nitrogen blanket, at room temperature, giving a slightly viscous solution. Then, 1.0 milliliter (1.25 grams) of boron trifluoride etherate is added and mixed well followed by the addition of 1.0 milliliter (1.18 grams) of epichlorohydrin dropwise. The stirrer is then removed and the jar capped. When the concentration of the solids reaches 40 percent, gelation occurs and the whole solution sets up to a clear, solid mass. This is then precipitated into methanol in a blender. Extraction of the resulting white solid polymer with hot methanol followed by drying in a vacuum oven at 50° C. affords 37 grams of graft copolymer having an $\eta_{inh}$ of 0.97. Evaporation of the combined methanol washes gave 6.3 grams (15 weight percent) of homo - poly(tetrahydrofuran). Any of the before-mentioned catalysts can also be used in place of the boron trifluoride etherate-epichlorohydrin cocatalyst system.

This graft copolymer resembles plasticized poly(vinyl chloride) in that its pressed film is tough and elastomeric. The amount of grafted poly(tetrahydrofuran) can be varied by varying the amount of tetrahydrofuran polymerized. The greater the amount of tetrahydrofuran, the more poly(tetrahydrofuran) grafted. The chain length of molecular weight of the grafted polymer can be varied by changing the concentrations of the cocatalysts. Along with the graft copolymer, there is also formed some ungrafted homo-poly(tetrahydrofuran) which, because it is incompatible with the grafted copolymer, makes the pressed films opaque and cheesy. However, this can easily be removed by extraction with hot methanol.

The mechanical properties of the graft copolymer are also similar to those of plasticized poly(vinyl chloride), as shown in the table. The graft copolymer was formulated with 2.5 phr. of a tin stabilizer, milled and press-polished into sheets from which tensile bars were cut. The tensile strength and 100 percent modulus decreases with increasing grafted poly(tetrahydrofuran) while the percent elongation increases. In a comparison of a 50 phr. graft copolymer and a conventionally plasticized vinyl with 50 phr. dioctyl phthalate, the percent elongation is the same for both samples (350%).

The low temperature flexibility is about the same for both grafted (50 phr.) and phthalate plasticized (50 phr.) polymers. So also is its susceptibility to mustard staining. The plasticized vinyl mars lacquer because of plasticizer migration; whereas, the grafted copolymer is without effect on a lacquered surface.

Since the graft copolymer is an "internally plasticized" vinyl resin rather than a resin plasticized with an added low molecular weight compound, the effects of solvent are quite different. The graft copolymer (50 phr.) is quite resistant to trichloroethylene, a dry cleaning solvent, and n-heptane, which would make it very useful for clothing (e.g., coats) and gasoline applications; whereas, the plasticized (50 phr.) vinyl loses most of its plasticizer and becomes quite brittle.

The major advantage of this graft copolymer is that it combines the 100 percent modulus and the low temperature flexibility of a good monomeric plasticizer with the solvent resistance and non-migration of a good polymeric plasticizer.

The following table illustrates the properties of the graft copolymers formed by this invention.

TABLE.—EVALUATION OF GRAFT COPOLYMERS PREPARED BY THE POLYMERIZATION OF TETRAHYDROFURAN (THF) IN THE PRESENCE OF POLY(VINYL CHLORIDE-CO-VINYL ALCOHOL-CO-VINYL ACETATE) (91/6/3)

| Sample | Phr. THF [1] | Phm. cocatalysts [2] BF3·OEt2 [3] | ECH [4] | Phr. grafted poly(THF) [5] | W/o poly(THF) extracted [6] | $\eta$inh [7] | Tensile (p.s.i.) | Percent elong. | 100% modulus (p.s.i.) |
|---|---|---|---|---|---|---|---|---|---|
| 1 | 200 | 1.3 | 0.8 | 11 | | 0.79 | 2,722 | 16 | |
| 2 | 200 | 1.9 | 1.8 | 15 | 8 | 0.70 | 3,016 | 185 | 2,684 |
| 3 | 300 | 1.2 | [8] 0.8 | 23 | 16 | 0.67 | 2,788 | 219 | 2,506 |
| 4 | 290 | 1.2 | 1.1 | 25 | 13 | 0.70 | 2,701 | 211 | 2,361 |
| 5 | 207 | 1.3 | 1.2 | 33 | 8 | 0.67 | 2,938 | 198 | 2,510 |
| 6 | 250 | 1.3 | 0.9 | [9] 34 | | | 2,162 | 253 | 1,378 |
| 7 | 273 | 1.2 | 1.0 | [9] 42 | | | 1,872 | 285 | 934 |
| 8 | 290 | 1.2 | 1.1 | 50 | 12 | 0.90 | 1,786 | 353 | 736 |
| 9 | 300 | 1.3 | 0.8 | 51 | | 0.63 | 1,912 | 359 | 723 |
| 10 | 400 | 1.3 | 1.2 | 57 | 21 | 1.12 | 1,580 | 517 | 367 |
| 11 | | | | 50 | | | 2,910 | 380 | 1,460 |
| 12 | | | | 50 | | | 2,840 | 350 | 1,550 |

[1] Parts of THF per hundred parts of hydroxy poly(vinyl chloride).
[2] Parts of cocatalyst per hundred parts of THF.
[3] Boron trifluoride etherate.
[4] Epichlorohydrin.
[5] Parts of grafted poly(THF) per hundred parts of hydroxy poly(vinyl chloride).
[6] Percent of ungrafted homo-poly(THF) extracted from polymer with hot methanol.
[7] 0.5 g./100 ml. cyclohexanone at 30° C.
[8] Propylene oxide used instead of epichlorohydrin.
[9] Polymer not extracted.

It is obvious that the invention is not restricted to the illustrative example and that it can be practiced in other ways within the scope of the appened claims.

What is claimed is:

1. A process for producing a graft copolymer comprising polymerizing tetrahydrofuran in the presence of an epoxide, a Lewis acid and a vinyl polymer containing pendant hydroxyl groups selected from the group consisting of polyvinyl alcohol and copolymers of a hydroxyl containing comonomer at a temperature of 0 to 60° C., whereby polytetrahydrofuran is grafted onto the vinyl polymer.

2. The process of claim 1 wherein a mixture of tetrahydrofuran and substituted tetrahydrofurans is substituted for tetrahydrofuran in step (a).

3. The process of claim 1 wherein the vinyl polymer is poly(vinyl chloride-co-vinyl alcohol-co-vinyl acetate).

4. The process of claim 1 wherein the vinyl polymer is poly(styrene-co-hydroxylethyl methacrylate).

5. The process of claim 1 wherein the vinyl polymer is poly(methyl methacrylate-co-hydroxylethyl methacrylate).

6. The composition of claim 1 wherein the vinyl polymer is selected from the group consisting of poly(vinyl chloride - co - vinyl acetate), poly (vinyl chloride-co-vinyl alcohol - co - vinyl neodecanate), poly(styrene-co-hydroxylethyl methacrylate), poly(methyl methacrylate-co-hydroxylethyl methacrylate), and poly(vinyl alcohol).

7. The process of claim 1 wherein the Lewis acid and epoxide combination is replaced by antimony pentachloride.

8. A composition of matter comprising a vinyl polymer containing pendant hydroxyl groups selected from the group consisting of polyvinyl alcohol and copolymers of a hydroxyl containing comonomer having thereon grafted side groups comprising polymeric tetrahydrofuran.

References Cited

UNITED STATES PATENTS 3,390,129   6/1968   Furukawa _____ 260—67
2,842,519   7/1958   Duggan _____ 260—874

FOREIGN PATENTS 1,001,345   8/1965   Great Britain _____ 260—2EP

OTHER REFERENCES

Otsu et al.: Graft Polymers Cont. Poyether Chains, J. Poly. Sci., Pt. B2(2), 223, 6 pp. 1964.

MURRAY TILLMAN, Primary Examiner

C. J. SECCURO, Assistant Examiner

U.S. Cl. XR.

260—899, 901